United States Patent
Hessmert et al.

(10) Patent No.: US 6,655,222 B2
(45) Date of Patent: Dec. 2, 2003

(54) DETERMINATION OF ROAD GRADIENT AND DETERMINATION OF TRAILER LOAD

(75) Inventors: Ulrich Hessmert, Schwieberdingen (DE); Jost Brachert, Ditzingen (DE); Thomas Sauter, Remseck (DE); Helmut Wandel, Markgroeningen (DE); Norbert Polzin, Zaberfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/021,122

(22) Filed: Oct. 29, 2001

(65) Prior Publication Data

US 2002/0091481 A1 Jul. 11, 2002

(30) Foreign Application Priority Data

Oct. 28, 2000 (DE) .......................... 100 53 603

(51) Int. Cl.$^7$ ................................. G01G 9/00
(52) U.S. Cl. ........................................ 73/865
(58) Field of Search .................. 73/865, 118.1, 73/862.541, 865.8

(56) References Cited

U.S. PATENT DOCUMENTS 4,548,079 A * 10/1985 Klatt ........................... 73/865
4,656,876 A * 4/1987 Fremd ........................ 73/865

FOREIGN PATENT DOCUMENTS

DE           43 446 34           7/1995

* cited by examiner

Primary Examiner—Robert Raevis
(74) Attorney, Agent, or Firm—Kenyon & Kenyon

(57) ABSTRACT

A device and method for determining values and/or generating signals, which can be used for closed-loop or open-loop controlling of the driving behavior of a vehicle equipped with a sensor system that detects wheel contact forces, includes determining the vehicle mass via the wheel contact forces that are detected, and further includes at least one of determining shifts in the wheel contact forces, and determining the required drive torque.

5 Claims, 1 Drawing Sheet

DETERMINATION OF ROAD GRADIENT AND DETERMINATION OF TRAILER LOAD

FIELD OF THE INVENTION

The present invention relates to a method for determining values that can be used for closed- or open-loop controlling of the driving behavior of a vehicle equipped with sensors to determine wheel contact forces, including a step in which the vehicle mass is determined via the wheel contact forces that are detected, and further relates to a device for generating signals which can be used for closed- or open-loop controlling of the driving behavior of a vehicle equipped with sensors that at least determine the wheel contact forces, and further relates to a device for carrying out the method.

BACKGROUND INFORMATION

In a traction control system, the transferrable drive torque, which may depend on, among other things, the driving situation and the friction conditions may be determined. When control measures are to be taken on an incline, for example, a transfer moment that corresponds to the friction value may be made available. In addition to the transfer moment, a moment that counteracts the downward force associated with the slope may be made available.

German Published Patent Application No. 43 446 34 discusses a traction control system in which, when drive instability arises, the engine torque is reduced to a value that is sufficient for the instant in question given disruptive influences such as gradient, trailer load and/or payload. As discussed in German Published Patent Application No. 43 446 34, however, the disruptive values gradient, payload or trailer load can only be determined jointly, by determining a higher required moment. It is believed that it may be disadvantageous if the operating principles of the control system cannot be adapted to the vehicle's particular status.

Furthermore, it is understood that the current vehicle mass has been determined via the sum of the wheel contact forces in addition to the payload.

SUMMARY OF THE INVENTION

The exemplary embodiment and/or exemplary method according to the present invention includes at least one of the following steps of: (b) detecting shifts in the wheel contact forces; and (c) detecting the required drive torque, so that values that allow closed- or open-loop control of the driving behavior to be adapted to the vehicle's current status can be determined.

Further, according to an exemplary embodiment and/or exemplary method of the present invention, it maybe inferred that a road gradient is present if the wheel contact forces shift without the vehicle mass having changed. This is based on recognizing that the wheel contact forces shift essentially proportionally to the road gradient.

Furthermore, it can be inferred that a trailer load is present if the required drive torque changes essentially without the vehicle mass having changed. It is noted in this context that the trailer support force transferred by a trailer to the vehicle is included in the calculation of the vehicle mass, but essentially does not substantially change it in the context of the exemplary embodiment and/or exemplary method of the present invention.

The wheel contact forces may be evaluated for the steady-state status of the vehicle. In this context, steady-state status may be deemed to exist when the vehicle is at a standstill or is traveling at a constant speed. It is believed that evaluating the wheel contact forces for the steady-state status of the vehicle may be advantageous because dynamic events such as longitudinal or transverse acceleration may influence the wheel contact forces.

In the context of the exemplary embodiment and/or exemplary method, step (c) may include generation of a moment equation for the driving resistances. For example, the drive torque, the air-resistance moment, the rolling-resistance moment, the acceleration resistance and the rotational-acceleration resistance may be included in this moment equation.

In the exemplary device of the present invention, the sensors send a first signal that indicates the wheel contact forces to an evaluation device, and the evaluation device uses the first signal to determine a shift in the wheel contact forces, so that signals that allow closed- or open loop controlling of a vehicle's driving behavior to be adapted to the vehicle's current status can be generated.

Furthermore, in the exemplary device of the present invention, the evaluation device may determine the vehicle mass via the first signal. For example, the payload can be determined via the vehicle mass, and a corresponding operating principle for the control system can be selected.

The device according to an exemplary embodiment of the present invention includes an apparatus, arrangement or structure to detect a change in the required drive torque.

Furthermore, the apparatus, arrangement or structure may send a second signal that indicates the required drive torque to the evaluation device, so that the evaluation device can recognize vehicle states which influence the required drive torque.

As in the exemplary method, the exemplary device of the present invention may have an evaluation device infer that a road gradient is present if the wheel contact forces shift without the vehicle mass having changed. As described, this inference is based on recognizing that the wheel contact forces shift essentially proportionally to the road gradient.

The evaluation device may send a third signal that indicates a road gradient, for example, to a traction control system. This road gradient can then be taken into account in the control of the drive torque.

It is also believed that it may be advantageous if the evaluation device sends a fourth signal that indicates the vehicle's payload. In various cases, knowledge of the vehicle's instantaneous payload may be required to ensure that the operating principle for the control system is chosen in an optimal manner.

In the exemplary device of the present invention, the evaluation device may infer that a trailer load is present if the required drive torque changes without the vehicle mass having changed significantly and without the wheel contact forces having shifted. In this case too, the trailer support force transferred to the vehicle by a trailer is included in determination of the vehicle mass. However, in the context of the exemplary embodiment and/or exemplary method of the present invention, this should not result in any significant change in the vehicle mass.

An exemplary device of the present invention may also send a fifth signal that indicates a trailer load. In various cases, knowledge of the trailer load may be required to ensure that the operating principle for the control system is chosen in an optimal manner.

As in the exemplary method, in the exemplary device of the present invention, the evaluation device evaluates values of the first signal that were obtained when the vehicle was in a steady-state status. As before, steady-state statuses are deemed to exist when the vehicle is at a standstill or traveling at a constant speed, so as to ensure that the wheel contact forces indicated by the first signal are not influenced by longitudinal or transverse accelerations.

The exemplary embodiments and/or exemplary methods of the present inventions involve recognizing that the wheel contact forces, in particular in conjunction with changes in the required drive torque that are detected, can be used to infer a plurality of vehicle states so that a suitable operating principle for the control system can be selected. These states may include, in particular, the following: vehicle has payload/does not have payload; vehicle has trailer load/does not have trailer load; vehicle is on a flat plane/vehicle is on an incline.

DETAILED DESCRIPTION

Figure 1:
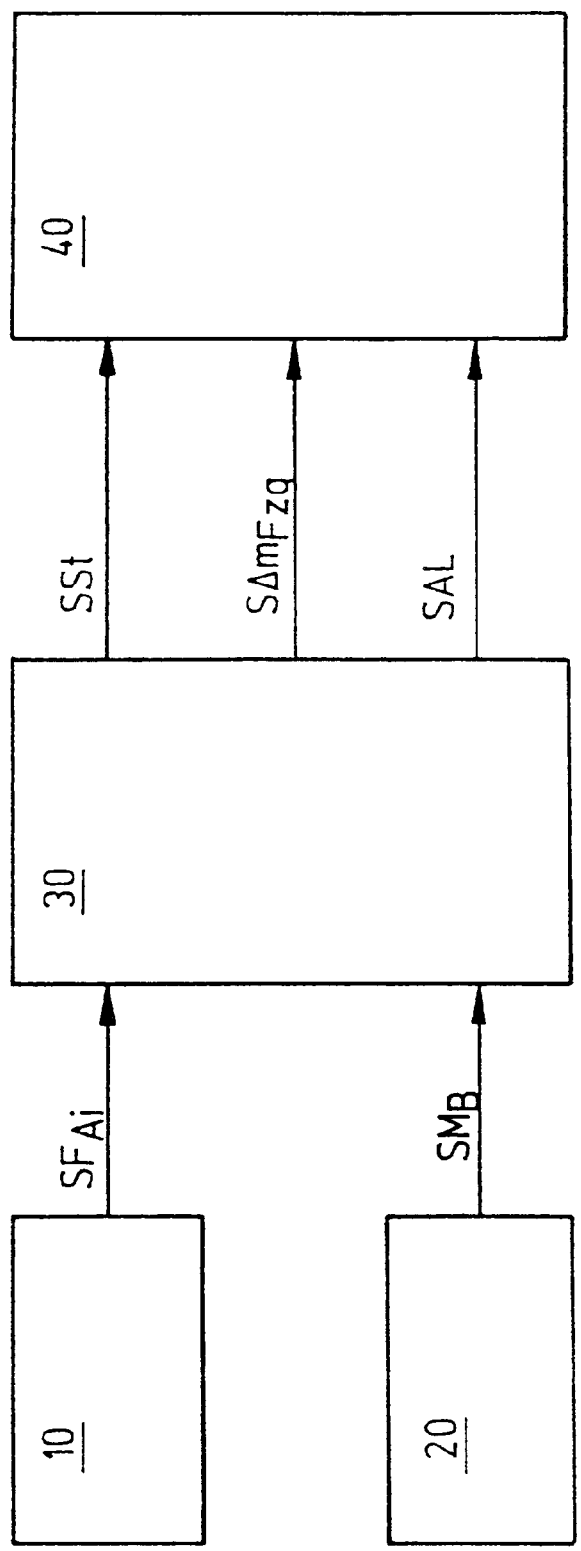
FIG. 1 shows a schematic block diagram of an exemplary device of the present invention for generating signals that can be used for closed- or open-loop controlling of the driving behavior of a vehicle equipped with sensors that determine at least the wheel contact forces.

In FIG. 1, block 10 is a sensor system which detects wheel contact forces. Sensor system 10 sends signal $SF_{Ai}$, which indicates the wheel contact forces $F_{Ai}$ that have been detected, to evaluation device 30. Furthermore, as shown in FIG. 1, an apparatus, arrangement or structure 20, sends a second signal $SM_B$ to evaluation device 30. This second signal $SM_B$ indicates required drive torque $M_B$. Evaluation device 30 is connected to traction control system 40 and sends to it third signal SSt, which indicates the road gradient, fourth signal $SA_{mFzg}$, which indicates the vehicle's payload, and fifth signal SAL, which indicates the trailer load.

To generate third signal SST, fourth signal $SA_{mFzg}$, and fifth signal SAL, evaluation device 30 evaluates first signal $SF_{Ai}$ and second signal $SM_B$. Evaluation device 30 infers that a road gradient is present if the wheel contact forces shift without the vehicle mass having changed. Furthermore, evaluation device 30 infers that a trailer load is present if the required drive torque changes without the vehicle mass having changed significantly and without the wheel contact forces having shifted. To determine the aforementioned values numerically, additional signals not shown in FIG. 1, which may include, for example, the drive torque, the air-resistance moment, the rolling-resistance moment, the acceleration resistance and the rotational-acceleration resistance, may be sent to evaluation device 30.

The above description of the exemplary embodiments and/or exemplary methods according to the present invention are exemplary, and are not intended to limit the scope of the present invention, since various changes and modifications may be made within the scope of the present invention.

What is claimed is:

1. A device for providing at least one of closed-loop control and open-loop control of a driving behavior of a vehicle having a sensor system to detect at least wheel contact forces, the device comprising:
   an evaluation device to receive from the sensor system a first signal indicating the wheel contact forces, and to determine a shift in the wheel contact forces based on the first signal; and
   an arrangement to determine a change in a required driving torque, wherein:
   the evaluation device is operable to determine a vehicle mass based on the first signal.

2. The device of claim 1, wherein the arrangement is operable to send a second signal that indicates the required driving torque to the evaluation device.

3. The device of claim 2, wherein the evaluation device is operable to output a third signal that indicates the road gradient.

4. The device of claim 3, wherein the evaluation device outputs a fourth signal that indicates a vehicle payload.

5. The device of claim 4, wherein the evaluation device outputs a fifth signal that indicates a trailer load.

* * * * *

UNITED STATES PATENT AND TRADEMARK OFFICE
CERTIFICATE OF CORRECTION

PATENT NO. : 6,655,222 B2
DATED : December 2, 2003
INVENTOR(S) : Ulrich Hessmert et al.

It is certified that error appears in the above-identified patent and that said Letters Patent is hereby corrected as shown below:

Column 1,
Line 46, change "(b) detecting shifts" to -- (a) detecting shifts --
Line 47, change "(c) detecting the required" to -- (b) detecting the required --
Line 52, change "it maybe" to -- it may be --

Signed and Sealed this

Eighteenth Day of January, 2005

JON W. DUDAS
*Director of the United States Patent and Trademark Office*